3,472,859
1-ALKYL-1,4-DIHYDRO-4-OXO-3 QUINOLINE-
CARBOXYLIC ACIDS AND ESTERS
George Y. Lesher, Schodack, N.Y., assignor to Sterling
Drug Inc., New York, N.Y., a corporation of Delaware
No Drawing. Filed Nov. 1, 1966, Ser. No. 591,095
Int. Cl. C07d 33/48; A01n 9/22; A61k 25/00
U.S. Cl. 260—287       8 Claims

ABSTRACT OF THE DISCLOSURE

A 1,4-dihydro-1-(lower-alkyl)-4-oxo-7(or 6)-phenyl-Y-3-quinolinecarboxylic acid or its lower-alkyl ester, where Y is $CH_2$, O, S, $CH_2S$ or is a direct linkage, is prepared by reacting the corresponding 3-(COOR)-4-hydroxy-7(or 6)-phenyl-Y-quinoline, where R is lower alkyl, with an alkylating agent, e.g., lower-alkyl halide, sulfate or sulfonate. The compounds have stimulatory, antibacterial and antifungal properties.

---

This invention relates to compositions of matter classified in the art of chemistry as 1,3-disubstituted-1,4-dihydro-4-oxoquinolines and to their preparation.

The invention sought to be patented, in its composition aspect, resides in the class of compounds which I designate 1,4-dihydro-1-(lower-alkyl) - 4 - oxo-7(or 6)-phenyl-Y-3-quinolinecarboxylic acids and lower-alkyl esters thereof where Y is a bivalent radical of the group $CH_2$, O, S, $CH_2O$ and $CH_2S$ or is a direct linkage between phenyl and the 7(or 6)-position of the quinoline ring. Accordingly, I depict these compounds as having phenyl attached to the 7(or 6)-position of a 1,4-dihydro-1-(lower-alkyl)-4-oxo-3-quinolinecarboxylic acid or lower-alkyl esters thereof either directly or through $CH_2$, O, S, $CH_2O$ or $CH_2S$. The tangible embodiments of this composition aspect of the invention possess the inherent applied use characteristics of having stimulant properties, as determined by standard pharmacological evaluation procedures, and, further, of having chemotherapeutic properties, e.g., antibacterial activity and antifungal activity, as determined by standard chemotherapeutic evaluation procedures.

Without limiting the generality of the foregoing, illustrative and preferred embodiments of my composition embodiments are those of Formula I

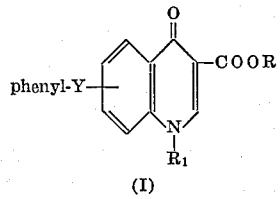

(I)

where Y is $CH_2$, O, S, $CH_2O$, $CH_2S$ or a direct linkage and is connected to the quinoline ring at position 6 or 7, R is hydrogen or lower-alkyl, and $R_1$ is lower-alkyl.

The benzene ring of "phenyl" can bear any number and kind of substituents such as would occur to those skilled in the art. The presence of such substituents on the benzene ring does not adversely affect the pharmacological or chemotherapeutic activity of the compositions of this invention. Among such substituted-benzene rings are, without limiting the generality of the foregoing: lower-alkylphenyl, e.g., methylphenyl, ethylphenyl, isopropylphenyl, or any other analogous lower-alkylphenyl group; halophenyl, e.g., fluorophenyl, chlorophenyl, bromophenyl, iodophenyl, or any other analogous halophenyl group; lower-alkoxyphenyl, e.g., methoxyphenyl, ethoxyphenyl, butoxyphenyl, or any other analogous lower-alkoxyphenyl group; trifluoromethylphenyl; lower-alkylthiophenyl, e.g., methylthiophenyl, butylthiophenyl, or any other analogous lower-alkylthiophenyl groups; N,N-di-lower-alkylaminophenyl, e.g., N,N-dimethylaminophenyl, N-methyl-N-ethylaminophenyl, or any other analogous N,N-di-lower-alkylaminophenyl groups; lower-alkylsulfonylphenyl, e.g., methylsulfonylphenyl, ethylsulfonylphenyl, or any other analogous lower-alkylsulfonylphenyl groups; loweralkylaminophenyl, e.g., propylaminophenyl, butylaminophenyl, or any other analogous lower-alkylaminophenyl groups; lower-alkanoylaminophenyl, e.g., acetylaminophenyl, propionylaminophenyl, or any other analogous lower-alkanoylaminophenyl groups; lower-alkanoyloxyphenyl, e.g., acetoxyphenyl, propionoxyphenyl, or any other analogous lower-alkanoyloxyphenyl groups; hydroxyphenyl; aminophenyl; or any other equivalent substituted phenyl group. Also, phenyl can be replaced by one of the groups: 2- or 3-furyl, 2- or 3-thienyl, or cycloalkyl having three to six ring carbon atoms, e.g., cyclopropyl, cyclobutyl, cyclopentyl or cyclohexyl.

Each of the terms "lower-alkyl," "lower-alkoxy" and "lower-alkanoyl," as used above and throughout the specification and claims, e.g., as used in the definition of R or $R_1$ of Formula I or as substituents of the benzene ring of phenyl, means alkyl, alkoxy or alkanoyl radicals having from one to six carbon atoms which can be arranged as straight or branched chains, among which are, for purposes of illustration but without limiting the generality of the foregoing, methyl, ethyl, n-propyl, isopropyl, sec-butyl and n-hexyl for lower-alkyl; by methoxy, ethoxy, n-propoxy, isopropoxy, isobutoxy, n-amoxy and n-hexoxy for lower-alkoxy; and, by formyl, acetyl, propionyl (n-propanoyl), isobutyryl (2-methyl-n-propanoyl) and caproyl (n-hexanoyl) for lower-alkanoyl.

The invention sought to be patented, in its process aspect, is described as residing in the process for the preparation of the composition aspect of the invention, illustrated by Formula I above, by reacting the corresponding 3 - (COOR) - 4-hydroxy-7(or 6)-phenyl-Y-quinoline, illustrated by Formula II

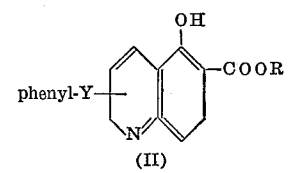

(II)

where Y and R have the meaning given above for Formula I, R preferably being lower-alkyl, with a lower-alkyl ester of a strong acid, i.e., an acid which is practically completely dissociated in aqueous solution. Illustrative and preferred esters are lower-alkyl esters of a strong inorganic acid or an organic sulfonic acid, said ester having the Formula $R_1$—An, where An is an anion of a strong inorganic acid or an organic sulfonic acid, e.g., chloride, bromide, iodide, sulfate, methanesulfonate, benzenesulfonate, and para-toluenesulfonate. $R_1$ has the meaning given above for Formula I. The chloride, bromide or iodide is preferred because of the ready availability of the requisite lower-alkyl halides; and the reaction is carried out preferably in the presence of an acid-acceptor. The acid-acceptor is a basic substance which preferably forms freely water-soluble by-products easily separable from the product of the reaction, including for example, sodium hydroxide, potassium hydroxide, sodium carbonate, potassium carbonate, sodium alkoxides, potassium alkoxides, sodium amide, and the like. The purpose of the acid-acceptor is to take up the hydrogen halide (or HAn) which is split out during the course of the reaction. The reaction can be carried out in either the presence or absence of a suitable solvent, but preferably in a solvent such as a lower-alkanol, acetone, dioxane, dimethylformamide, dimethyl sulfoxide, or a mixture of solvents, e.g., a mixture of water and a lower-alkanol. The reaction is generally carried out at a temperature between about room temperature (about 25° C.) and 150° C., preferably heating on a steam bath in a stirred mixture of dimethylformamide and anhydrous potassium carbonate.

When R is lower-alkyl, i.e., when the intermediate is a lower-alkyl (phenyl-Y)-4-hydroxy-3-quinolinecarboxylate, the reaction is conveniently carried out by heating the quinoline ester with a lower-alkyl ester of a strong acid, preferably a lower-alkyl halide, in a non-aqueous solvent, e.g., dimethylformamide, in the presence of anhydrous potassium carbonate to yield the corresponding lower-alkyl (phenyl-Y)-1,4-dihydro-1-(lower-alkyl)-4-oxo-3-quinolinecarboxylate. If the final product is desired in acid form, the lower-alkyl ester is readily hydrolyzed by heating it with aqueous potassium or sodium hydroxide solution to obtain the (phenyl-Y)-1,4-dihydro-1-(lower-alkyl)-4-oxo-3-quinolinecarboxylic acid. Alternatively, but with lower yields, the (phenyl-Y)-4-hydroxy-3-quinolinecarboxylic acid can be 1-alkylated directly as described above preferably using an aqueous lower-alkanol, e.g., ethanol, as the solvent and an acid-acceptor, e.g., potassium carbonate.

Some of the intermediate (phenyl-Y)-4-hydroxy-3-quinolinecarboxylic acids and lower-alkyl esters are known, e.g., 4-hydroxy-7-phenoxy-3-quinolinecarboxylic acid and ethyl ester, 4-hydroxy-6-phenoxy-3-quinolinecarboxylic acid and ethyl ester. Other such intermediates, where novel, are prepared by the generally known method of first reacting a 3(or 4)-phenyl-Y-aniline with diethyl ethoxymethylenemalonate to form the corresponding diethyl 3(or 4)-phenyl-Y-anilinomalonate which is then cyclized by heating in a suitable solvent, e.g., mineral oil, to form the ethyl 4-hydroxy-7(or 6)-phenyl-Y-3-quinolinecarboxylate. The 3(or 4)-phenyl-Y-anilines are generally known and are prepared by known methods.

Alternatively, the compounds of Formula I where Y is S can be prepared by reacting the corresponding compound having halo, e.g., chloro, in place of phenyl-Y with the appropriate thiophenol in the form of its metal salt derivative, e.g., sodium or potassium salt, as illustrated hereinbelow in the specific examples. The intermediate halo-3-(COOR)-1,4-dihydro-1-(lower-alkyl)-4-oxoquinolines, i.e., compounds of Formula I having halo in place of phenyl-Y, are known.

Some of the compounds of the invention where phenyl bears substituents which are convertible to other substituents have the further utility of intermediates, e.g., 7-(4-acetylaminobenzyl)-1-ethyl-1,4-dihydro-4-oxoquinoline-3-carboxylic acid is converted by acid hydrolysis to 7-(4-aminobenzyl)-1-ethyl-1,4-dihydro-4-oxoquinoline-3-carboxylic acid; said 7-(4-aminobenzyl) compound can be diazotized and converted to the corresponding 7-(4-hydroxybenzyl) compound; the corresponding 7-(4-nitrobenzyl) compound can be reduced to give said 7-(4-aminobenzyl) compound; and, other useful transformations will be apparent to the skilled chemist.

Also within the scope of the invention are 3-carboxylic acid cationic salts of my above-described 1,4-dihydro-1-(lower-alkyl)-4-oxo-3-quinolinecarboxylic acids. Preferred types of salts are those having cations which do not increase the toxicity of the compound as a whole toward animal organisms. These comprise the alkali metal salts, e.g., the sodium or potassium salts; the lower-alkaline earth metal salts, e.g., magnesium or calcium salts; and, the ammonium or organic amine salts, e.g., diethanolamine or N-methyl-glucamine salts. Although medicinally acceptable salts are preferred, other and all cationic salts are within the scope of my invention. All such salts, including those having toxic cations, are useful in characterizing the free acids and as intermediates in purification of the free acids. The salts are prepared from the acids using methods illustrated hereinbelow in the examples.

The molecular structures of the compounds of my invention were assigned on the basis of study of their infrared, ultraviolet and NMR spectra, and confirmed by the correspondence of calculated and found values for the elementary analyses for representative examples.

My phenyl-Y-1,4-dihydro-1-(lower-alkyl)-4-oxo-3-quinolinecarboxylic acids and lower-alkyl esters when tested according to standard pharmacological evaluation procedures in animals, have been found to possess the inherent applied use characteristics of exerting a central nervous stimulant effect in animal organisms. For example, when administered orally to mice using a modified procedure of the photocell activity cage method of Dews [Brit. J. Pharmacol. 8, 46 (1953)], these embodiments were found to have psychomotor stimulatory properties at dose levels of about 0.25 to 300 mg. per kg. of body weight; this test is referred to hereinbelow as the Psychomotor Stimulatory Test (PST). Also, when administered intraperitoneally to mice in the Reserpine Ptosis Reversal and Prevention Tests, as described below, these compounds were found to prevent and to reverse reserpine-induced eyelid ptosis at dose levels of about 0.5 to 50 mg. per kg. of body weight.

The Reserpine Ptosis Reversal Test (RPRT) is described briefly as follows: Unfasted male mice weighing 17 to 30 gms. are grouped in cages of eight animals each. The mice are injected intraperitoneally with 2 mg. per kg. of reserpine, and three hours later with test agent. One-half hour after administration of test agent the degree of eyelid ptosis is scored. The scores are evaluated by means of the rank sum test and the results are reported as probability values. The compounds are initially tested at 30 and 50 mg. per kg. If significant activity is noted at these doses, the compound is further tested at progressively lower doses, e.g., 10, 1, 0.5, 0.25 mg. (salt)/kg., until an inactive dose is found.

The Reserpine Ptosis Prevention Test (RPPT) is described briefly as follows: Unfasted male mice weighing 17 to 30 gms. are grouped in cages of eight animals each. The mice are injected intraperitoneally with the test agent. Two hours later the mice are injected intraperitoneally with 2 mg. per kg. of reserpine. Three hours after the administration of reserpine the degree of eyelid ptosis is scored. The scores are evaluated by means of the rank sum test and the results are reported as probability values. The compounds are initially tested at 30 and 50 mg. per kg. If significant activity is noted at these doses, the compound is further tested at progressively lower doses, e.g., 10, 1, 0.5, 0.25 mg. (salt)/kg., until an inactive dose is found.

For purposes of illustration but without limiting the generality of the foregoing, active doses determined by the above-described procedures, designated by PST, RPRT and RPPT respectively, are given hereinbelow for compounds of the invention.

The following examples will further illustrate the invention without, however, limiting it thereto.

EXAMPLE 1

(a) Ethyl 7-benzyl-1-ethyl-1,4-dihydro-4-oxo-3-quinolinecarboxylate.—A mixture containing 12.0 g. of ethyl 7-benzyl-4-hydroxy-3-quinolinecarboxylate and 60 cc. of dimethylformamide was heated on a steam bath with stirring, and to the stirred mixture was added 11 g. of potassium carbonate whereupon the quinoline gradually dissolved. To the resulting stirred solution was added 12 cc. of ethyl iodide and the reaction mixture was heated for five hours with stirring. The reaction mixture was filtered to remove the solid and the filtrate was diluted with about 300 cc. of water whereupon there separated a white precipitate. The precipitate was collected and recrystallized from 150 cc. of ethanol to yield 11.9 g. (91% yield) of white crystalline ethyl 7-benzyl-1-ethyl-1,4-dihydro-4-oxo-3-quinolinecarboxylate, M.P. 202–204° C.

(b) 7-benzyl-1-ethyl-1,4-dihydro-4-oxo-3-quinolinecarboxylic acid was prepared by hydrolysis of the above ester as follows: A mixture containing 11.7 g. of ethyl 7-benzyl-1-ethyl-1,4-dihydro-4-oxo-3-quinolinecarboxylate, 41 cc. of 10% aqueous potassium hydroxide solution, 50 cc. of water and 50 cc. of ethanol was heated on a steam bath for about one hour, after which time the ethanol had boiled off. The reaction mixture was poured into a mixture containing 15 cc. of concentrated hydrochloric acid and 100 cc. of water. The resulting precipitate was collected, washed sparingly with ethanol, dried two hours in a vacuum oven at 80° C. and recrystallized from about 25 cc. of dimethylformamide, followed by trituration with ethanol and drying in a vacuum oven at 70° C. to yield 10.0 g. of white crystalline 7-benzyl-1-ethyl-1,4-dihydro-4-oxo-3-quinolinecarboxylic acid, M.P. 189.0–191.6° C. (corr.).

*Analysis.*—Calcd. for $C_{19}H_{17}NO_3$: C, 74.25; H, 5.58; N, 4.56. Found: C, 74.36; H, 5.33; N, 4.60.

7-benzyl-1-ethyl-1,4-dihydro-4-oxo-3-quinolinecarboxylic acid was found to have central nervous stimulatory activity at 10 mg./kg. when tested by each of the above-described procedures designated as RPPT and RPRT. Also, this compound was found to have in vitro bacteriostatic activity against *Staphylococcus aureus, Eberthella typhi, Clostridium welchii* and *Pseudomonas aeruginosa* at test concentrations of 0.05, 0.10, 0.025 and 0.075 mg./cc. respectively.

(c) The intermediate ethyl 7-benzyl-4-hydroxy-3-quinolinecarboxylate used in Example 1a was prepared as follows: To a stirred, heated solution of 1200 cc. of diethyl phthalate at 270° C. was added 85 g. of diethyl N-(3-benzylanilino)methylenemalonate and the resulting reaction mixture was heated with stirring at 280–285° C. for four minutes and then allowed to cool gradually with stirring to room temperature. The resulting precipitate was collected, triturated with ethanol, dried, and recrystallized from about 200 cc. of dimethylformamide followed by trituration with ethanol and drying at 65° C. in a vacuum oven to yield 29.5 g. of ethyl 7-benzyl-4-hydroxy-3-quinolinecarboxylate, M.P. 277.0–278.2° C. (corr.).

*Analysis.*—Calcd. for $C_{19}H_{17}NO_3$: C, 74.25; H, 5.58; N, 4.56. Found: C, 74.54; H, 5.57; N, 4.35.

(d) Diethyl N-(3-benzylanilino)methylenemalonate, used as an intermediate in Example 1c, was prepared as follows: A mixture containing 55 g. of 3-benzylaniline and 68 g. of diethyl ethoxymethylenemalonate was heated to 150° C. and allowed to cool to about 80° C. whereupon 200 cc. of ethanol was added. The resulting mixture was allowed to cool to about 20° C. After the product started to crystallize, the resulting mixture was cooled to about 5° C. and the white crystalline product was collected, washed with about 50 cc. of cold ethanol and dried to yield 81 g. of diethyl N-(3-benzylanilino)methylenemalonate, M.P. 60.2–62.2° C. (corr.).

*Analysis.*—Calcd. for $C_{21}H_{23}NO_4$: C, 71.37; H, 6.56; N, 3.96. Found: C, 71.47; H, 6.69; N, 4.02.

(e) The following respective lower-alkyl esters of the above 3-quinolinecarboxylic acid of Example 1b are readily obtained by conversion of the acid to its acid chloride by reaction with thionyl chloride and reaction of the acid chloride with methyl alcohol, isopropyl alcohol, n-butyl alcohol or n-hexyl alcohol, respectively: methyl, isopropyl, n-butyl or n-hexyl 7-benzyl-1-ethyl-1,4-dihydro-4-oxo-3-quinolinecarboxylate.

(f) Following the procedure of Example 1a and using methyl iodide, n-propyl chloride, isobutyl paratoluenesulfonate or n-hexyl bromide in place of ethyl iodide, there is obtained, respectively, ethyl 7-benzyl-1,4-dihydro-1-methyl-4-oxo-3-quinolinecarboxylate, ethyl 7-benzyl-1,4-dihydro-4-oxo-1-n-propyl-3-quinolinecarboxylate, ethyl 7-benzyl-1,4-dihydro-1-isobutyl-4-oxo-3-quinolinecarboxylate or ethyl 7-benzyl-1-n-hexyl-1,4-dihydro-4-oxo-3-quinolinecarboxylate; the corresponding respective 3-quinolinecarboxylic acids are obtained by alkaline hydrolysis of the ester with aqueous potassius hydroxide solution as in Example 1b.

(g) Following the procedures of Examples 1d, 1c and 1a, respectively, but using in place of 3-benzylaniline, 4-(4-methoxybenzyl)aniline, 4-(4-acetylaminobenzyl)aniline, 4-(4-nitrobenzyl)aniline, 4-(4-chlorobenzyl)aniline, 4-(4-bromobenzyl)aniline, 4-(2-methyl-5-nitrobenzyl) aniline or 4-(3,4-dimethoxybenzyl)aniline, there is obtained, after the third step (procedure of Example 1a), the following ethyl 1-ethyl-1,4-dihydro-4-oxo-6-substituted-3-quinolinecarboxylate where the 6-substituent is, respectively, 4-methoxybenzyl, 4-acetylaminobenzyl, 4-nitrobenzyl, 4-chlorobenzyl, 4-bromobenzyl, 2-methyl-5-nitrobenzyl or 3,4-dimethoxybenzyl. The corresponding 6-(4-aminobenzyl) compound is obtained by acid hydrolysis of the 6-(4-acetylaminobenzyl) compound or by reduction (e.g., using tin and hydrochloric acid) of the 6-(4-nitrobenzyl) compound. The 6-(4-hydroxybenzyl) compound is formed by diazotizing the 6-(4-aminobenzyl) compound and hydrolyzing the resulting diazonium salt. Reaction of the 6-(4-aminobenzyl) compound with two molar equivalents of dimethylsulfate or one molar equivalent of n-butyl bromide yields, respectively, the corresponding 6-(4-dimethylaminobenzyl) or 6-(4-n-butylaminobenzyl) compound. Following the procedure of Example 1b, the above ethyl esters are converted to the corresponding 1-ethyl-1,4-dihydro-4-oxo-6-substituted-3-quinolinecarboxylic acids. All of the above intermediate 4-(substituted-benzyl)anilines are known compounds.

(h) The 3-quinolinecarboxylic acid of Example 1b can be converted by the generally known procedures of cationic salt formulation of carboxylic acids to yield its sodium, potassium, magnesium or diethanolamine salt.

EXAMPLE 2

(a) 1-ethyl-1,4-dihydro-4-oxo-7-phenoxy-3-quinolinecarboxylic acid.—A mixture containing 15.5 g. of ethyl 4-hydroxy-7-phenoxy-3-quinolinecarboxylate, 27.6 g. of anhydrous potassium carbonate, and 150 cc. of dimethylformamide was stirred on a steam bath for ten minutes. To this stirred mixture was added 15.6 g. of ethyl iodide and the resulting reaction mixture was heated with stirring for one hour and then poured into 1000 cc. o fan ice-water mixture with stirring. The solid that separated was collected to yield ethyl 1-ethyl-1,4-dihydro-4-oxo-7-phenoxy-3-quinolinecarboxylate which was converted into the corresponding acid by heating it in 150 cc. of 5% aqueous potassium hydroxide solution for one hour on a steam bath. The reaction mixture was acidified with 6 N hydrochloric acid solution and the solid that separated was collected and recrystallized once from isopropyl alcohol and once from acetonitrile, and air-dried to yield 7.5 g. of the white product, 1-ethyl-1,4-dihydro-4-oxo-7-phenoxy-3-quinolinecarboxylic acid, M.P. 205.5–206.5° C. (corr.).

*Analysis.*—Calcd. for $C_{18}H_{15}NO_4$: N, 4.53. Found: N, 4.59.

1-ethyl-1,4-dihydro-4-oxo-7-phenoxy-3-quinolinecarboxylic acid was found to have central nervous stimulatory activity when tested by each of the above-described procedures designated as PST, RPPT and RPRT at doses of 0.25, 0.50 and 0.50 mg./kg. respectively. Also, this compound was found to have in vitro bacteriostatic activity against *Staphylococcus aureus, Eberthella typhi* and *Pseudomonas aeruginosa* at test concentrations of 0.025, 0.10, 0.025 and 0.10 mg./cc. respectively.

(b) The intermediate ethyl 4-hydroxy-7-phenloxy-3-quinolinecarboxylate was prepared as follows: To a gently refluxing solution of 1000 cc. of Dowtherm A was added 96 g. of diethyl 3-phenoxyanilinomethylenemalonate and the resulting reaction mixture was refluxed gently for about twenty minutes, allowing the ethanol formed by the reaction to distill off and then allowed to cool to room temperature. The solid that separated was collected, washed successively with n-hexane and n-pentane and dried in vacuo at 60° C. to yield 62.5 g. (74%) of ethyl 4-hydroxy-7-phenoxy-3-quinolinecarboxylate. A 10 g. sample when recrystallized from dimethylformamide, washed with methanol and dried in vacuo at 60° C. melted at 292.0–294.0° C. (corr.) with decomposition. [Riegel, J.A.C.S. 68, 1264 (1946) reported a melting point of 278–279° C.]

(c) The above intermediate diethyl 3-phenoxyanilinomethylenemalonate was prepared as follows: A mixture containing 50 g. of 3-phenoxyaniline and 59 g. of diethyl ethoxymethylenemalonate was stirred on a steam bath for ten minutes and allowed to cool to room temperature.

(d) Following the procedure of Example 2a and using n-butyl chloride, isobutyl para-toluenesulfonate or n-hexyl bromide in place of ethyl iodide, there is obtained, respectively, 1 - n - butyl-1,4-dihydro-4-oxo-7-phenoxy-3-quinolinecarboxylic acid, 1,4-dihydro-1-isobutyl-4-oxo-7-phenoxy-3-quinolinecarboxylic acid, or 1-n-hexyl-1,4-dihydro-4-oxo-7-phenoxy-3-quinoline-carboxylic acid, the corresponding ethyl ester being first obtained in each instance and then hydrolyzed to the 3-quinolinecarboxylic acid.

(e) Following the three-step procedure described in Examples 2c, 2b and 2a respectively but using in place of 3 - phenoxyaniline, 3 - (3 - chlorophenoxy)aniline, 3 - (2-chlorophenoxy)aniline, 3 - (2 - methoxyphenoxy)aniline, 3 - (4 - methoxyphenoxy)aniline or 3-(4-nitrophenoxy) - aniline, there is obtained, after the third step (procedure of Example 2a), the corresponding 1 - ethyl-1,4-dihydro-4-oxo-7-substituted-3-quinolinecarboxylic acid where the 7-substituent is, respectively, 3-chlorophenoxy, 2-chlorophenoxy, 2-methoxyphenoxy, 4-methoxyphenoxy or 4-nitrophenoxy. Following the same three-step procedure but replacing 3-phenoxyaniline with 4-(4-tert-butylphenoxy)aniline, 4 - (4 - methoxyphenoxy) aniline, 4-(2-methoxyphenoxy)aniline, 4 - (4 - nitrophenoxy)aniline, 4-(2,4-dichlorophenoxy)aniline, 4-(3,5-dimethoxyphenoxy)aniline or 4-(4-methylphenoxy)aniline, there is obtained, after the third step, the corresponding 1-ethyl-1,4-dihydro-4-oxo - 6 - substituted-3-quinolinecarboxylic acid where the 6-substituent is, respectively, 4-tert-butylphenoxy, 4-methoxyphenoxy, 2-methoxyphenoxy, 4-nitrophenoxy, 2,4-dichlorophenoxy, 3,5-dimethoxyphenoxy or 4-methylphenoxy. Reduction of the 1-ethyl-1,4-dihydro-7(or 6)-(4-nitrophenoxy)-4-oxo-3-quinolinecarboxylic acid yields the corresponding 7(or 6)-(4-aminophenoxy) compound, which on diazotization followed by hydrolysis yields the corresponding 7(or 6)-(4-hydroxyphenoxy) compound. Reaction of the 7(or 6)-(4-hydroxyphenoxy) compound with acetic anhydride yields the corresponding 7(or 6)-(4-acetoxyphenoxy) compound. Also, following the three-step procedure of Examples 2c, 2b and 2a, respectively, but using 4-cyclohexyloxyaniline, 4 - cyclohexylthioaniline, 4 - cyclopropylaniline, 4-(2-furyl)aniline, 4-(2-methoxy-4-nitrophenylthio) aniline, 4-(4-methoxyphenylthio)aniline, 4 - (4 - nitrophenylthio)aniline, 4-(2-thienyl)aniline, 4 - (4 - methylphenylthio)aniline or 4-(4-methylsulfonylphenylthio)aniline in place of 3-phenoxyaniline, there is obtained the corresponding 1-ethyl-1,4-dihydro-4-oxo - 6 - substituted-3-quinolinecarboxylic acid where the 6-substituent is, respectively, cyclohexyloxy, cyclohexylthio, cyclopropyl, 2-furyl, 2-methoxy-4-nitrophenylthio, 4-methoxyphenylthio, 4-nitrophenylthio, 2-thienyl, 4-methylphenylthio or 4-methylsulfonylphenylthio; similarly, using 3-(4-methylsulfonylphenylthio)aniline or 3-(2-thienyl)aniline, there is otbained 1-ethyl - 1,4 - dihydro-4-oxo-7-substituted-3-quinolinecarboxylic acid where the 7-substituent is 4-methylsulfonylphenylthio or 2-thienyl, respectively. All of the foregoing intermediate 3(or 4)-susbtituted-anilines are known compounds.

EXAMPLE 3

(a) 1-ethyl-1,4-dihydro-4-oxo-7-phenylthio-3-quinolinecarboxylic acid.—A mixture of 11.0 g. of thiophenol, 6.4 g. of potassium hydroxide (87% Baker) and 75 cc. of dimethylacetamide was stirred until a solution was formed and was then heated to a temperature of about 165° C. to distill off the water formed by the reaction of the potassium hydroxide with the thiophenol to form potassium thiophenolate. An additional 25 cc. of dimethylacetamide was added, the solution was allowed to cool to about 110° C. and 20.0 g. of 7-chloro-1-ethyl-1,4-dihydro-4-oxo-3-quinolinecarboxylic acid was added followed by the addition of another 6.4 g. of potassium hydroxide. The reaction mixture was heated to 165° C., another 50 cc. portion of dimethylacetamide was added, and the resulting mixture was refluxed for five hours and then poured into 1000 cc. of cold water. To the resulting mixture was added 25 cc. of 10% aqueous potassium hydroxide solution. The cloudy solution was then acidified with an excess of 6 N hydrochloric acid. The resulting precipitate was collected, air-dried, recrystallized from acetonitrile using decolorizing charcoal and dried in vacuo at 60° C. to yield 14.5 g. of 1-ethyl-1,4-dihydro-4-oxo-7-phenylthio-3-quinolinecarboxylic acid, M.P. 201.2–204.0° C. (corr.).

Analysis.—Calcd. for $C_{18}H_{15}NO_3S$: C, 66.44; H, 4.65; S, 9.85. Found: C, 66.30; H, 4.70; S, 9.48.

1-ethyl - 1,4 - dihydro-4-oxo-7-phenylthio-3-quinolinecarboxylic acid was found to have central nervous stimulatory activity when tested by the above-described procedures designated as PST, RPPT and RPRT at doses of 1.0 30 and 50 mg./kg. respectively. This compound also was found to have in vitro bacteriostatic activity against Staphylococcus aureus, Eberthella typhi, Clostridium welchii and Pseudomonas aeruginosa at test concentrations of 0.01, 0.10, 0.025 and 0.075 mg./cc., respectively.

(b) The intermediate 7-chloro-1-ethyl-1,4-dihydro-4-oxo-3-quinolinecarboxylic acid used in Example 3a was prepared as follows: A mixture containing 112 g. of 7-chloro-4-hydroxy-3-quinolinecarboxylic acid and 1250 cc. of 95% ethanol was brought to reflux, 81 g. of potassium hydroxide (86% Baker) was added and the mixture refluxed until all solid material had dissolved. To the solution was added 250 cc. of ethyl iodide and the resulting mixture refluxed for ninety minutes. The reaction mixture was allowed to cool and the resulting heavy white precipitate was collected, washed with acetone and dissolved in warm water. The solution was filtered and to the filtrate was added concentrated hydrochloric acid. The resulting precipitate was collected, washed with acetone, recrystallized from acetic acid, washed with acetone and dried in a vacuum oven at 80° C. to yield 35.7 g. of 7-chloro-1-ethyl-1,4-dihydro-4-oxo - 3 - quinolinecarboxylic acid, M.P. 257–266° C.

(c) Following the procedure described in Example 3b and using methyl iodide, n-propyl chloride, isobutyl para-toluenesulfonate or n-hexyl bromide in place of ethyl iodide, there is obtained, respectively 7-chloro-1,4-dihydro-1-methyl-4-oxo-3-quinolinecarboxylic acid, 7-chloro-1,4-dihydro-4-oxo-1-n-propyl-3-quinoline-carboxylic acid, 7 - chloro-1,4-dihydro-1-isobutyl-4-oxo-3-quinolinecarboxylic acid or 7-chloro-1-n-hexyl-1,4-dihydro-4-oxo-3-quinolinecarboxylic acid. Reaction of these compounds with potassium thiophenolate following the procedure of Example 3a yields, respectively, 1,4-dihydro-1-methyl-4-oxo-7-phenylthio-3-quinolinecarboxylic acid, 1,4 - dihydro-4-oxo - 7-phenylthio-1-n-propyl-3-quinolinecarboxylic acid, 1,4 - dihydro - 1-isobutyl-4-oxo-7-phenylthio-3-quinolinecarboxylic acid or 1-n-hexyl-1,4-dihydro-4-oxo-7-phenylthio-3-quinolinecarboxylic acid. Conversion of these acids to the respective 3-carboxylic acid chloride by reaction with thionyl chloride and reaction of the acid chloride with ethyl alcohol yields the respective ethyl 3-quinoline-carboxylates.

EXAMPLE 4

(a) Ethyl 1,4 - dihydro - 1-methyl-4-oxo-7-phenoxy-3-quinolinecarboxylate.—A mixture containing 13.9 g. of ethyl 4-hydroxy-7-phenoxy-3-quinolinecarboxylate, 20.7 g. of anhydrous potassium carbonate and 100 cc. of dimethylformamide was heated with stirring on a steam bath for about twenty minutes. To the mixture was added 6 cc. of methyl iodide and heating with stirring was continued for two hours. The hot reaction mixture was filtered and the filtrate poured into 750 cc. of ice water. The product which separated as an oily material solidified after a few minutes, was collected, washed with water and dried to yield 13.0 g. (89%) of white ethyl 1,4-dihydro-1-methyl - 4 - oxo-7-phenoxy-3-quinoline-carboxylate, M.P. 162–164° C.

(b) 1,4 - dihydro - 1-methyl-4-oxo-7-phenoxy-3-quinolinecarboxylic acid.—A mixture containing 13.0 g. of ethyl 1,4-dihydro-1-methyl-4-oxo-7-phenoxy-3-quinolinecarboxylate, 31 cc. of 10% aqueous potassium hydroxide solution and 40 cc. of water was heated on a steam bath for one hour and then filtered. To the filtrate was added 11 cc. of 6 N hydrochloric acid to yield a white precipitate which was collected, washed with water, dried in a vacuum oven at 60° C., recrystallized from about 50 cc. of dimethylformamide, washed with ethanol and dried in vacuo at 60° C. to yield 11.1 g. of 1,4-dihydro-1-methyl-4-oxo-7-phenoxy-3-quinolinecarboxylic acid, M.P. 228.0–229.0° C. (corr.).

Analysis.—Calcd. for $C_{17}H_{13}NO_4$: C, 69.14; H, 4.44; N, 4.74. Found: C, 68.80; H, 4.29; N, 4.91.

1,4 - dihydro-1-methyl-4-oxo-7-phenoxy-3-quinolinecarboxylic acid was found to have central nervous stimulatory activity when tested by the above-described procedures designated as PST, RPPT and RPRT at 0.25, 50 and 0.50 mg./kg. respectively.

EXAMPLE 5

(a) Ethyl 1,4-dihydro-4-oxo-7-phenoxy-1-n-propyl-3-quinolinecarboxylate was prepared following the procedure described in Example 4a using 13.9 g. of ethyl 4-hydroxy-7-phenoxy-3-quinolinecarboxylate, 20.7 g. of anhydrous potassium carbonate, 100 cc. of dimethylformamide, 16 g. of n-propyl iodide and a heating period of four hours.

(b) 1,4 - dihydro-4-oxo-7-phenoxy-1-n-propyl-3-quinolinecarboxylic acid, M.P. 190.0–193.0° C. (corr.), was obtained following the procedure described in Example 4b using the corresponding ester of Example 5a, 31 cc. of 10% aqueous potassium hydroxide, 100 cc. of water, a heating period of ninety minutes and acidification with hydrochloric acid. There was obtained 10.6 g. of the product after recrystallization from ethanol.

Analysis.—Calcd. for $C_{19}H_{17}NO_4$: C, 70.57; H, 5.30; N, 4.33. Found: C, 70.39; H, 5.40; N, 4.25.

1,4-dihydro-4-oxo-7-phenoxy-1-n-propyl-3-quinolinecarboxylic acid was found to have central nervous stimulatory activity when tested by the abovedescribed procedures designated as PST and RPRT at 0.25 and 10 mg./kg. respectively.

EXAMPLE 6

(a) 1 - Ethyl - 1,4-dihydro-4-oxo-7-phenyl-3-quinolinecarboxylic acid.—A mixture containing 12.4 g. of ethyl 4-hydroxy-7-phenyl-3-quinolinecarboxylate, 18 g. of anhydrous potassium carbonate, 16 cc. of ethyl iodide and 500 cc. of dimethylformamide was heated on a steam bath under a reflux condenser for seven hours. The reaction mixture was filtered to remove the solid and the filtrate was evaporated in vacuo to remove the solvent. To the residual material was added water and enough 6 N hydrochloric acid to make the solution acidic (pH of 2). The acidic solution was extracted with chloroform and the extract dried over anhydrous potassium carbonate and concentrated to a small volume. To the chloroform solution was added several volumes of n-hexane and the resulting precipitate was collected and recrystallized from 80 cc. of ethanol to yield ethyl 1-ethyl-1,4-dihydro-4-oxo-7-phenyl-3-quinolinecarboxylate, M.P. 128–129° C. This ester was converted into corresponding acid by dissolivng it in 80 cc. of warm ethanol, adding 51 cc. of 10% aqueous potassium hydroxide solution and heating on a steam bath in an open beaker for about three hours, adding water occasionally to maintain a constant volume. The solution was then poured into 20 cc. of 6 N hydrochloric acid with stirring and the white solid that separated was collected and recrystallized once from dimethylformamide and once from acetonitrile and dried at 70° C. in vacuo to yield 5.9 g. of 1-ethyl-1,4-dihydro-4-oxo-7-phenyl-3-quinolinecarboxylic acid, M.P. 215.0–216.8° C. (corr.).

Analysis.—Calcd. for $C_{18}H_{15}NO_3$: C, 73.70; H, 5.15; N, 4.78. Found: C, 73.72; H, 5.07; N, 4.87.

(b) The intermediate ethyl 4 - hydroxy - 7 - phenyl-3-quinolinecarboxylate used in Example 6a was prepared by heating with stirring a solution containing 39.7 g. of diethyl 3-phenylanilinomethylenemalonate in 400 cc. of diethyl phthalate at 278–283° C. for two and one-half minutes. The reaction mixture was allowed to cool with stirring and the solid that separated was collected and washed with ethanol. The resulting solid was combined with a solid obtained from an earlier run starting with 30 g. of diethyl 3-phenylanilinomethylenemalonate and the combined solids were recrystallized from about 600 cc. of dimethylformamide, washed with ethanol and dried to yield 27.0 g. of ethyl 4-hydroxy-7-phenyl-3-quinoline-carboxylate, M.P. 320–325° C. with decomposition.

(c) The intermediate diethyl 3-phenylanilinomethylenemalonate used in Example 6b was prepared as follows: A mixture containing 44.3 g. of 3-phenylaniline and 57.5 g. of diethyl ethoxymethylenemalonate was heated on a steam bath for two hours and then allowed to cool to yield 94 g. of the product as a viscous liquid which was used in Example 6b without further purification.

EXAMPLE 7

1,4 - dihydro - 1-methyl-4-oxo-7-phenyl-3-quinolinecarboxylic acid.—A mixture containing 13.5 g. of ethyl 4-hydroxy-7-phenyl-3-quinolinecarboxylate, 18.5 g. of anhydrous potassium carbonate, 16 cc. of methyl iodide and 400 cc. of dimethylformamide was heated with stirring on a steam bath for six and one-half hours. The reaction mixture was filtered to remove the solid and the filtrate was concentrated and allowed to cool. The separated solid was collected, triturated in water and crystallized from about 200 cc. of ethanol. After an infrared analysis of this material had indicated incomplete alkylation, it was combined with 100 cc. of dimethylformamide, 13.8 g. of anhydrous potassium carbonate and 16 cc. of methyl iodide and the resulting mixture was heated on a steam bath with stirring for six hours. The hot reaction mixture was filtered to remove the solid and the filtrate was concentrated and cooled. The resulting precipitate was collected, triturated with water and the aqueous mixture filtered to yield ethyl 1,4-dihydro-1-methyl-4-oxo-7-phenyl-3-quinolinecarboxylate. This ester was then dissolved in 100 cc. of hot ethanol, 103 cc. of 5% aqueous potassium hydroxide solution was added, and the resulting reaction mixture was heated on a steam bath for about three hours allowing the solvents to evaporate and adding water when the volume became low. The hot reaction mixture was filtered and the filtrate acidified with 6 N hydrochloric acid. The precipitate was collected, recrystallized from about 70 cc. of dimethylformamide, washed with water and dried to yield 8.9 g. of 1,4-dihydro - 1 - methyl-4-oxo-7-phenyl-3-quinolinecarboxylic acid, M.P. 240.0–241.0° C. (corr.).

Analysis.—Calcd. for $C_{17}H_{13}NO_3$: C, 73.11; H, 4.69; N, 5.02. Found: C, 72.23; H, 4.80; N, 4.92.

1,4 - dihydro - 1-methyl-4-oxo-7-phenyl-3-quinolinecarboxylic acid was found to have central nervous stimulatory activity at 300 mg./kg. when tested by the abovedescribed procedure designated as PST. Also, this compound was found to have in vitro fungistatic activity against *Trichophyton mentagrophytes* at 0.10 mg./cc.

EXAMPLE 8

(a) Ethyl 6 - benzyl - 1 - ethyl-1,4-dihydro-4-oxo-3-quinolinecarboxylate, M.P. 203–205° C. was obtained following the procedure described in Example 1a using 15.36 g. of ethyl 6-benzyl-4-hydroxy-3-quinolinecarboxylate, 13.8 g. of anhydrous potassium carbonate, 100 cc. of dimethylformamide, 12 cc. of ethyl iodide and a heating period of seven hours. There was thus obtained 12.7 g. of the ester.

(b) 6 - benzyl - 1-ethyl-1,4-dihydro-4-oxo-3-quinolinecarboxylic acid, M.P. 185.0–187.0° C. (corr.) was obtained following the procedure described in Example 1d using 12.6 g. of ethyl 6-benzyl-1-ethyl-1,4-dihydro-4-oxo-3-quinolinecarboxylate, 41 cc. of 10% aqueous potassium hydroxide solution and 40 cc. of ethanol. There was thus obtained 7.2 g. of the product after recrystallization from dimethylformamide.

*Analysis.*—Calcd. for $C_{19}H_{17}NO_3$: C, 74.25; H, 5.58; N, 4.56. Found: C, 74.29; H, 5.62; N, 4.20.

6 - benzyl - 1 - ethyl - 1,4 - dihydro-4-oxo-3-quinolinecarboxylic acid was found to have central nervous stimulatory activity at 10 mg./kg. when tested by the above-described procedure designated as PST.

(c) The intermediate ethyl 6 - benzyl - 4 - hydroxy-3-quinolinecarboxylate used in Example 8a was prepared following the procedure described in Example 1c using 87 g. of diethyl 4-benzylanilinomethylenemalonate and 1300 cc. of diethyl phthalate. There was thus obtained 26.0 g. of the compound, M.P. 281.0–282.0° C. (corr.).

*Analysis.*—Calcd. for $C_{19}H_{17}NO_3$: C, 74.25; H, 5.58; N, 4.56. Found: C, 74.15; H, 5.49; N, 4.49.

(d) Diethyl 4 - benzylanilinomethylenemalonate, used as an intermediate in Example 8c was prepared following the procedure described in Example 1d using 72 g. of 4-benzylaniline and 86 g. of diethyl ethoxymethylenemalonate. There was thus obtained 105.8 g. of this intermediate, M.P. 63.8–65.0° C. (corr.).

*Analysis.*—Calcd. for $C_{21}H_{23}NO_4$: C, 71.37; H, 6.56; N, 3.96. Found: C, 71.19; H, 6.54; N, 3.85.

EXAMPLE 9

(a) Ethyl 1 - ethyl - 1,4 - dihydro - 4-oxo-6-phenoxy-3-quinolinecarboxylate was prepared following the procedure described in Example 4a using 21.5 g. of ethyl 4-hydroxy-6-phenoxy-3-equiolinecarboxylate, 19.3 g. of anhydrous potassium carbonate, 100 cc. of dimethylformamide, 20 cc. of ethyl iodide and a heating period of four and one-half hours. There was thus obtained 20.0 g. of the product, M.P. 140–143° C.

(b) 1 - ethyl-1,4-dihydro-4-oxo-6-phenoxy-3-quinolinecarboxylic acid, M.P. 182.0°–182.4° C. (corr.), was obtained following the procedure described in Example 4b using 20.0 g. of ethyl 1-ethyl-1,4-dihydro-4-oxo-6-phenoxy-3-quinolinecarboxylate, 70 cc. of 10% aqueous potassium hydroxide solution, 70 cc. of ethanol and a heating period of two hours. There was thus obtained 17.0 g. of the product.

*Analysis.*—Calcd. for $C_{18}H_{15}NO_4$: C, 69.89; H, 4.89; N, 4.53. Found: C, 70.13; H, 5.26; N, 4.50.

1 - ethyl - 1,4 - dihydro - 4 - oxo - 6 - phenoxy - 3-quinolinecarboxylic acid was found to have central nervous stimulatory activity when tested by the above-described procedures designated as PST, RPPT and RPRT at respective doses of 1.0, 50 and 50 mg./kg. This compound also was found to have in vitro bacteriostatic activity against *Staphylococcus aureus, Clostridium welchii* and *Pseudomonas aeruginosa* at 0.05, 0.075 and 0.10 mg./cc. respectively.

EXAMPLE 10

(a) 7 - benzyloxy - 1 - ethyl - 1,4 - dihydro - 4 - oxo - 3-quinolinecarboxylic acid.—A mixture containing 14.8 g. of 7 - benzyloxy - 4 - hydroxy - 3 - quinolinecarboxylic acid, 250 cc. of 1 N sodium hydroxide solution and 23.1 g. of diethyl sulfate was stirred for eighteen hours at room temperature. The reaction mixture was then refluxed with stirring for five minutes and concentrated hydrochloric acid was added to the hot stirred mixture until acidic. The mixture was allowed to cool and the precipitate was collected, dried in vacuo at 55° C. for three days to yield 13.5 g. of 7-benzyloxy-1-ethyl-1,4-dihydro-4-oxo - 3 - quinolinecarboxylic acid, M.P. 227–228.5° C. For analysis, a 3 g. portion was recrystallized from 10 cc. of dimethylformamide, washed with small portions of dimethylformamide and dried in vacuo at 55° C. for about sixteen hours to yield 2.5 g. of product, M.P. 230.0–233.0° C. (corr.).

*Analysis.*—Calcd. for $C_{19}H_{17}NO_4$: C, 70.57; H, 5.30; N, 4.33. Found: C, 70.61; H, 5.33; N, 4.48.

7 - benzyloxy - 1 - ethyl - 1,4 - dihydro - 4 - oxo - 3-quinolinecarboxylic acid was found to have central nervous stimulatory activity when tested by the above-described procedures designated as PST and RPRT at 1.0 and 50 mg./kg. respectively.

(b) The above intermediate 7 - benzyloxy-4-hydroxy-3-quinolinecarboxylic acid was prepared in three steps starting with 3-benzyloxyaniline as follows: A mixture containing 138.2 g. of 3-benzyloxyaniline and 165.2 g. of diethyl ethoxymethylenemalonate was heated on a steam bath for one hour and then allowed to cool to form diethyl 3 - benzyloxyanilinomethylenemalonate which was then added to 700 cc. of Dowtherm A and the mixture heated with stirring at 250° C. for about fifteen minutes while distilling off 51 cc. of ethanol. The mixture was allowed to cool and stand at room temperature overnight. The solid that separated was collected, washed with n-hexane, triturated with about 800 cc. of hot methanol, the mixture filtered and the solid dried in vacuo at 55° C. for about sixteen hours to yield 75.1 g. of ethyl 7-benzyloxy-4-hydroxy-3-quinolinecarboxylate, M.P. 281° C. A mixture containing 50.1 g. of ethyl 7-benzyloxy - 4 - hydroxy - 3 - quinolinecarboxylate and 430 cc. of 10% aqueous sodium hydroxide solution was refluxed with stirring for two hours; the hot reaction mixture was diluted with about 300 cc. of hot water; treated with decolorizing charcoal and filtered through infusorial earth; and the filtrate as allowed to cool and stand at room temperature overnight. The filtrate was acidified with about 130 cc. of concentrated hydrochloric acid and cooled. The resulting precipitate was collected and triturated with about 500 cc. of water. The solid was then collected by filtering the aqueous mixture and was air-dried to yield 48.4 g. of 7 - benzyloxy-4-hydroxy-3-quinolinecarboxylic acid, M.P. 268–269.5° C.

(c) Following the three-step procedure of Example 10b but using 4-benzylthioaniline, a known compound, in place of 3-benzyloxyaniline, there is obtained, after the third step, 6-benzylthio-4-hydroxy-3-quinolinecarboxylic acid, which when used in the procedure of Example 10a in place of 7-benzyloxy-4-hydroxy-3-quinolinecarboxylic acid yields 6-benzylthio-1-ethyl-1,4-dihydro-4-oxo-3-quinolinecarboxylic acid.

I claim:

1. A compound of the formula

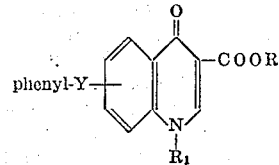

where Y is $CH_2$, O, S, $CH_2O$ or $CH_2S$ and is connected to the quinoline ring at position 6 or 7, R is hydrogen or lower-alkyl, and $R_1$ is lower-alkyl.

2. A compound according to claim 1 where Y is $CH_2$, R is hydrogen and $R_1$ is lower-alkyl.

3. A compound according to claim 1 where Y is O, R is hydrogen and $R_1$ is lower-alkyl.

4. A compound according to claim 1 where Y is S, R is hydrogen and $R_1$ lower-alkyl.

5. 7 - benzyl - 1 - ethyl - 1,4 - dihydro - 4 - oxo - quinoline-3-carboxylic acid, according to claim 1 where phenyl-Y- is 7-benzyl, R is hydrogen and $R_1$ is ethyl.

6. 1 - ethyl - 1,4 - dihydro - 4 - oxo - 7 - phenoxy-quinoline-3-carboxylic acid, according to claim 1 where phenyl-Y- is 7-phenoxy, R is hydrogen and $R_1$ is ethyl.

7. 1,4 - dihydro - 1 - methyl - 4 - oxo - 7 - phenoxy-quinoline-3-carboxylic acid, according to claim 1 where phenyl-Y- is 7-phenoxy, R is hydrogen and $R_1$ is methyl.

8. 1 - ethyl - 1,4 - dihydro - 4 - oxo - 7 - phenylthio-3-quinolinecarboxylic acid, according to claim 1 where phenyl-Y- is 7-phenylthio, R is hydrogen and $R_1$ is ethyl.

References Cited

UNITED STATES PATENTS

| 3,414,576 | 12/1968 | Cairns et al. | 260—287 |
| 3,267,106 | 8/1966 | Watson | 260—287 |
| 3,290,315 | 12/1966 | Watson | 260—287 |

FOREIGN PATENTS

| 1,122,323 | 8/1968 | Great Britain. |
| 1,122,435 | 8/1968 | Great Britain. |
| 830,832 | 3/1960 | Great Britain. |
| 1,070,223 | 6/1967 | Great Britain. |
| 1,070,333 | 6/1967 | Great Britain. |

OTHER REFERENCES

British 942, 524 (Norwich) November 1963, Abstracted in Chem. Abstr. vol. 60, cols. 5468–9.

ALEX MAZEL, Primary Examiner

D. G. DAUS, Assistant Examiner

U.S. Cl. X.R.

260—571, 473, 561, 578, 689, 329, 609; 424—250, 258

PO-1050
(5/69)

UNITED STATES PATENT OFFICE
CERTIFICATE OF CORRECTION

Patent No. 3,472,859                     Dated October 14, 1969

Inventor(s)    George Y. Lesher

It is certified that error appears in the above-identified patent and that said Letters Patent are hereby corrected as shown below:

Column 2, line 48, "meaning" should read --meanings--; lines 40-45, formula II should read --

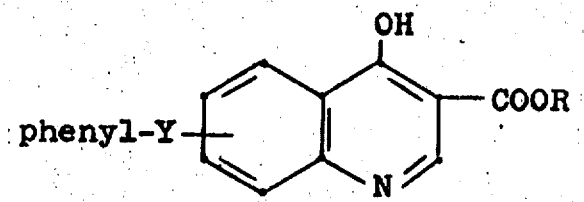

(II)--.

Column 6, line 42, "o fan" should read --of an--; line 65, "phenloxy" should read --phenoxy--. Column 8, line 26, "1.0" should read --1.0,--. Column 9, line 73, "dissolivng" should read --dissolving--. Column 10, line 69, "72.23" should read --73.23--. Column 11, line 12, "ld" should read --lb--; line 45, "equiolinecarboxylate" should read --quinolinecarboxylate--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents